United States Patent
Hu et al.

(10) Patent No.: US 9,140,827 B2
(45) Date of Patent: Sep. 22, 2015

(54) LENS, LED LIGHT SOURCE UNIT HAVING THE LENS AND LED LIGHT SOURCE MODULE INCORPORATING THE UNIT

(71) Applicant: HON HAI PRECISION INDUSTRY CO., LTD., New Taipei (TW)

(72) Inventors: Chau-Jin Hu, New Taipei (TW); Feng-Yuen Dai, New Taipei (TW); Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 100 days.

(21) Appl. No.: 14/067,961

(22) Filed: Oct. 31, 2013

(65) Prior Publication Data

US 2015/0003063 A1    Jan. 1, 2015

(30) Foreign Application Priority Data

Jun. 28, 2013  (TW) .................................. 102123089

(51) Int. Cl.
| | |
|---|---|
| *G02B 3/00* | (2006.01) |
| *F21V 5/04* | (2006.01) |
| *F21Y 101/02* | (2006.01) |
| *G02F 1/1335* | (2006.01) |

(52) U.S. Cl.
CPC ... *G02B 3/00* (2013.01); *F21V 5/04* (2013.01); *F21Y 2101/02* (2013.01); *G02F 1/133603* (2013.01); *G02F 2001/133607* (2013.01)

(58) Field of Classification Search
CPC ........... G02F 1/133; G09F 13/00; G02B 3/00; F21Y 2101/02; F21V 5/04; F21V 5/02; F21V 5/048
USPC .............................. 362/311.09, 311.1, 311.02
See application file for complete search history.

(56) References Cited

U.S. PATENT DOCUMENTS

2014/0168972 A1*  6/2014  Ebner ........................... 362/235

* cited by examiner

*Primary Examiner* — Anne Hines
(74) *Attorney, Agent, or Firm* — Novak Druce Connolly Bove + Quigg LLP

(57) ABSTRACT

A lens includes a light incident face receiving light from an LED light source, a light exit face, and a connecting face interconnecting the light incident face and the light exit face. The light exit face is a convex face. The connecting face includes a plurality of inclined reflecting planes located at a circumferential periphery of the lens and extending downwardly and inwardly from a position near to an outer edge of the light exit face toward the light incident face. The inclined reflecting planes of the connecting face are positioned around an optical axis of the lens. An LED light source module includes a plurality of the lens each diverging light from a corresponding LED light source and a light diffuser having a plurality of light diffusing units each over a corresponding lens. Each light diffusing unit has a shape of the regular hexagon.

12 Claims, 5 Drawing Sheets

LENS, LED LIGHT SOURCE UNIT HAVING THE LENS AND LED LIGHT SOURCE MODULE INCORPORATING THE UNIT

TECHNICAL FIELD

The present disclosure relates generally to a lens, a light source unit having the lens and a light source module incorporating the light source unit and a light diffuser, wherein the light source unit and the light source module have an improved light distribution pattern with a more uniform illumination.

DESCRIPTION OF RELATED ART

LEDs are solid state light emitting devices formed of semiconductors, which are more stable and reliable than other conventional light sources such as incandescent bulbs. Thus, LEDs are being widely used in various fields such as numeral/character displaying elements, signal lights, light sources for lighting and display devices.

Nowadays, light emitting diode (LED) light sources are widely applied for illumination, such as being used for backlight module, indoor lighting or billboard illumination. An LED light source unit includes an LED light source and a divergent lens coupled to the LED light source to spread light. In use, the LED light source units are arranged together on a mounting surface to form an LED light source module in order to obtain a planar light output.

However, a light intensity pattern of each LED light source unit is circular such that an irradiation field region irradiated from an LED light source unit partially overlaps adjacent irradiation field region irradiated from adjacent LED light source unit. In addition, a light intensity distribution of the LED light source unit is mostly concentrated at an optical axis while becomes gradually weaker towards a periphery thereof. Therefore, the LED light module having the LED light source unit is difficult to satisfy the requirements of uniform light distribution, unless a great number of LED light source units are mounted on the mounting surface. However, to do so will increase the cost, which is unfavorable.

What is needed therefore is a lens, an LED light source unit having the lens and an LED light source module incorporating the LED light source unit and a light diffuser which can overcome the above mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
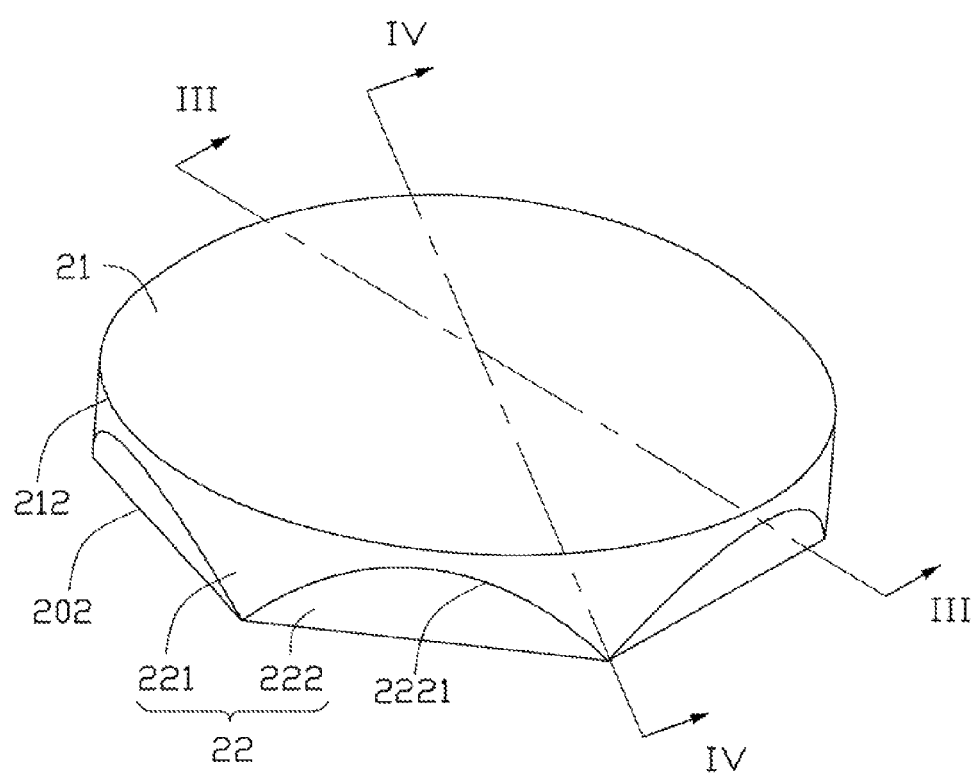
FIG. 1 is an isometric, perspective view of an LED (light emitting diode) light source unit in accordance with an exemplary embodiment of the present disclosure.
Figure 2:
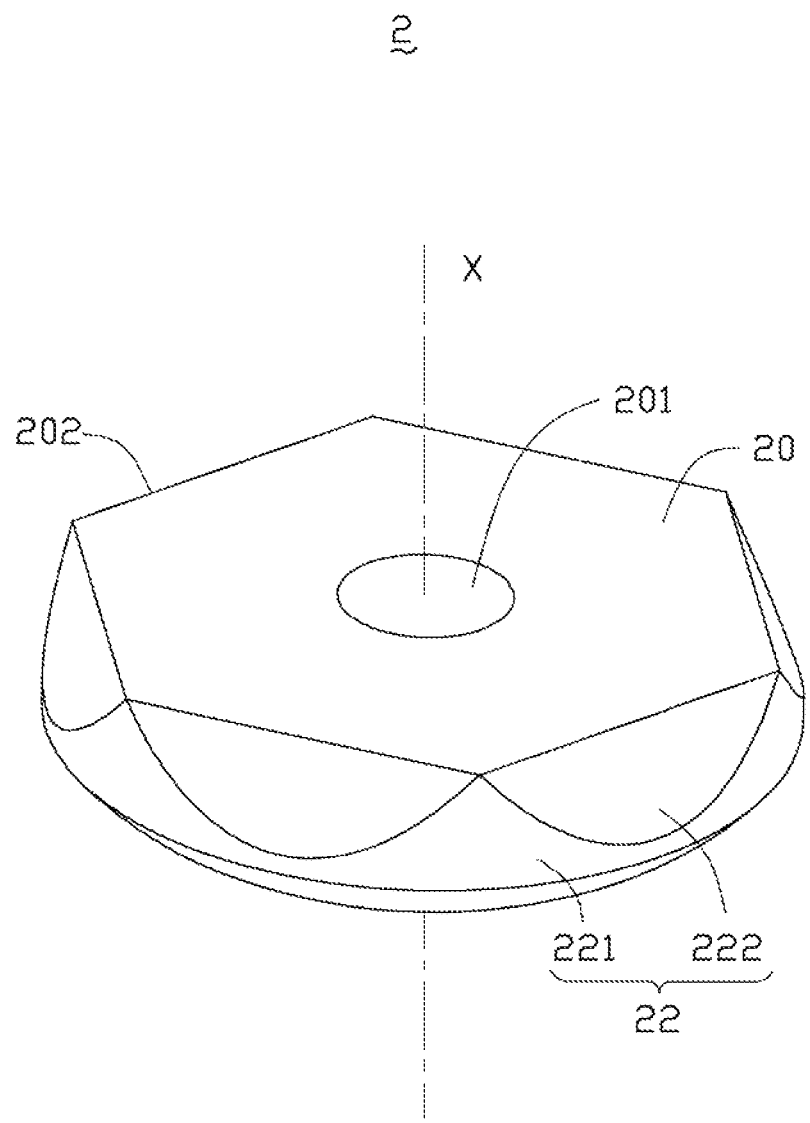
FIG. 2 is an inverted view of a lens of the LED light source unit of FIG. 1.
Figure 3:
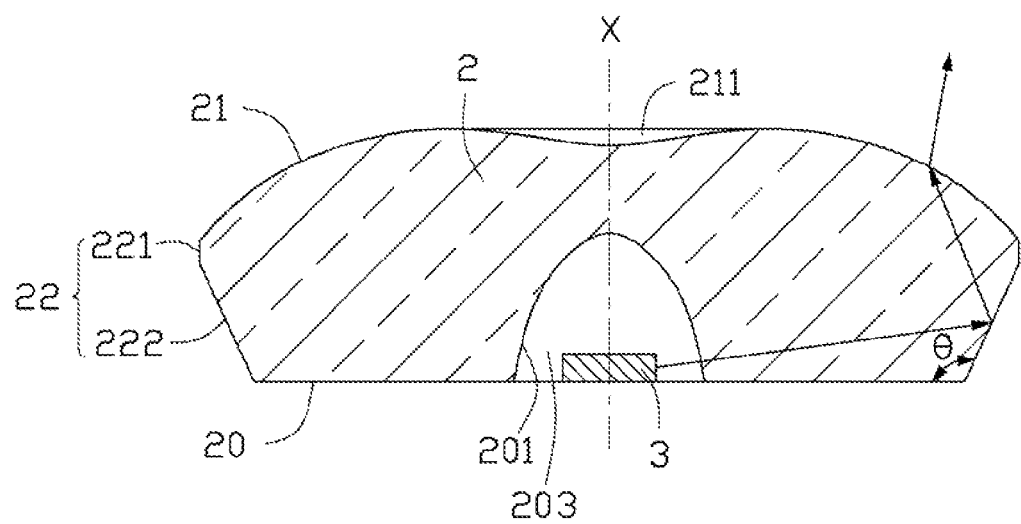
FIG. 3 is a cross-sectional view of the LED light source unit of FIG. 1, taken along a line III-III thereof.
Figure 4:
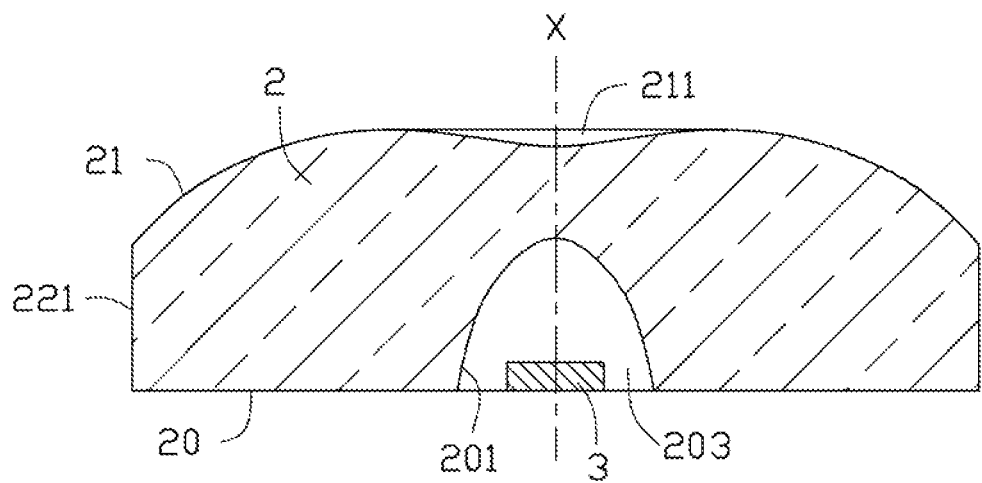
FIG. 4 is a cross-sectional view of the LED light source unit of FIG. 1, taken along a line IV-IV thereof.

Referring to FIGS. 1, 2, 3 and 4, an LED (light emitting diode) light source unit 1 in accordance with an exemplary embodiment of the present disclosure includes an LED light source 3 and a lens 2 coupled to the LED light source 3. The lens 2 includes a light incident face 201, a light exit face 21 opposite to the light incident face 201, a connecting face 22 extending between the light incident face 201 and the light exit face 21, and an annular mounting face 20 interconnecting the light incident face 201 and the connecting face 22. The LED light source 3 faces the light incident face 201 of the lens 2.

The light incident face 201 is a concave face and radially symmetrical relative to an optical axis X of the lens 2. The light incident face 201 is located at a center of the mounting face 20 and recessed inwardly from an inner edge of the mounting face 20 toward the light exit face 21 of the lens 2. In the present embodiment, the light incident face 201 is ellipsoid, and a major axis of the light incident face 201 is collinear with the optical axis X of the lens 2. Alternatively, the light incident face 201 is paraboloid or spherical.

The light exit face 21 is a convex face and radially symmetrical relative to the optical axis X of the lens 2. The light exit face 21 defines a recess 211 in a center thereof, and the recess 211 is recessed inwardly toward the light incident face 201 of the lens 2.

The connecting face 22 of the lens 2 includes a plurality of inclined reflecting planes 222 located at a circumferential periphery of the lens 2 and extending downwardly and inwardly from a position near to an outer edge 212 of the light exit face 21 toward an outer edge 202 of the mounting face 20. The inclined reflecting planes 222 of the connecting face 22 are positioned around the optical axis X of the lens 2. In the present disclosure, the connecting face 22 is radially symmetrical relative to the optical axis X of the lens 2. More in details, the inclined reflecting planes 222 of the connecting face 22 are radially symmetrical relative to the optical axis X of the lens 2.

The connecting face 22 of the lens 2 includes a circumferential surface 221 extending between the inclined reflecting planes 222 and the light exit face 21. The circumferential surface 221 extends downwardly from the outer edge 212 of the light exit face 21 toward the outer edge 202 of the mounting face 20. Each inclined reflecting plane 222 and the circumferential surface 221 intersect at an arc 2221 extending upwardly from the outer edge 202 of the mounting face 20 to an apex of the arc 2221 and then downwardly back to the outer edge 202. A height of the circumferential surface 221 firstly decreases gradually and then increases gradually from one endpoint toward another endpoint of the arc 2221. There are six arcs 2221 connected together end-to-end.

In the present embodiment, the inner edge of the mounting face 20 is a circle, and the outer edge 202 is a regular hexagon including six sides connected end-to-end. The inclined reflecting planes 222 intersect with the mounting face 20 at six sides of the hexagonal outer edge 202. The mounting face 20 is a horizontal plane, and an angle θ between each inclined reflecting plane 222 and the mounting face 20 is equal to each other. In the present disclosure, the angle θ is an obtuse angle which is no less than a sum of a right angle and a critical angle for total internal reflection on the lens-air interface. That is to say, the light incident on the reflecting plane 222 is totally reflected by the reflecting plane 222 toward the light exit face 21 of the lens 2.

The light incident face 201 and the mounting face 20 cooperatively define a receiving space 203. The LED light source 3 is received in the receiving space 203 and an optical axis of the LED light source 3 coincides with the optical axis X of the lens 2. The LED light source 3 may include an LED chip and an encapsulation encapsulating the LED chip. The encapsulation may be made of transparent silicone doped with fluorescent particles. By the design of the lens 2, the light from the LED light source 3 can be effectively diverged by the lens 2 into a large illumination angle.

Figure 5:
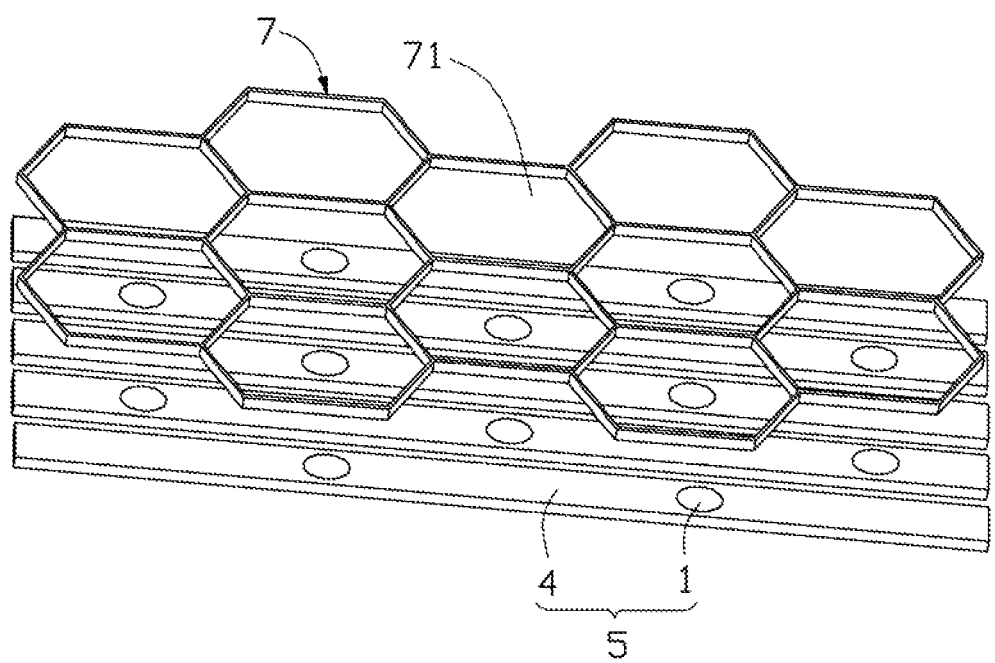
FIG. 5 is a schematic view of an LED light source module incorporating a plurality of LED light source units each is the same as that shown in FIG. 1 and a light diffuser over the LED light source units.

Referring to FIG. 5, an LED light source module 6 in accordance with an exemplary embodiment of the present disclosure includes a plurality of LED light bars 5 arranged side by side in an array. Each LED light bar 5 includes a printed circuit board 4 and a plurality of LED light source units 1 mounted thereon. The LED light source units 1 of two adjacent LED light bars 5 are arranged in a staggered manner. The LED light source module 6 further includes a light diffuser 7 consisting a plurality of regular hexagonal light diffusing units 71 each covering a corresponding LED light source unit 1, whereby the light from the LED light source units 1 can be more evenly mixed together before the light emits from the LED light source module 6. Thus, the light source module 6 can uniformly illuminate an object needing a planar illumination, such as a liquid crystal display (LCD) or a sign box.

In the present disclosure, light emitted from the LED light source 3 is refracted into the lens 2 through the light incident face 201, and a portion of light propagating toward the inclined reflecting plane 222 is reflected toward the light exit face 21 by the inclined reflecting plane 222, thereby creating an improved light distribution pattern with a hexagonal irradiation field having a large illumination angle.

In use, a plurality of LED light source units 1 are mounted on the printed circuit board 4 to form the LED light bar 5, and a plurality of LED light bars 5 are arranged side by side in an array to form the LED light source module 6. Since the LED light source units 1 of two adjacent LED light bars 5 are arranged in a staggered manner, the LED light source module 6 creates a uniform light output without bright spots.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens for diverging light from an LED (light emitting diode) light source comprising:
   a light incident face configured for receiving the light from the LED light source;
   a light exit face opposite to the light incident face, and the light exit face being a convex face;
   a connecting face extending between the light incident face and the light exit face, the connecting face being radially symmetrical relative to the optical axis of the lens; and
   an annular mounting face interconnecting the connecting face and the light incident face, wherein the light incident face is located at a center of the mounting face and recessed inwardly from an inner edge of the mounting face toward the light exit face of the lens;
   wherein the connecting face comprises a plurality of inclined reflecting planes located at a circumferential periphery of the lens and extending downwardly and inwardly from a position near to an outer edge of the light exit face toward the light incident face, and the inclined reflecting planes of the connecting face are positioned around an optical axis of the lens;
   wherein each inclined reflecting plane of the connecting face extends from a position near to the outer edge of the light exit face toward an outer edge of the mounting face;
   wherein the connecting face further comprises a circumferential surface between the inclined reflecting planes and the light exit face, and the circumferential surface extends downwardly from the outer edge of the light exit face toward the outer edge of the mounting face; and
   wherein each inclined reflecting plane and the circumferential surface intersect at an arc having a peak near the light exit face.

2. The lens of claim 1, wherein the mounting face is a horizontal plane, and an angle defined between each inclined reflecting plane and the mounting face is equal to each other.

3. The lens of claim 2, wherein the angle defined between each inclined reflecting plane and the mounting face is an obtuse angle, and the obtuse angle is more than a sum of a right angle and a critical angle for total internal reflection on the lens-air interface.

4. The lens of claim 1, wherein a height of the circumferential surface firstly decreases gradually and then increases gradually from one endpoint toward another endpoint of the arc.

5. An LED light source unit comprising:
   an LED light source; and
   a lens coupled to the LED light source;
   wherein the lens comprises a light incident face, a light exit face opposite to the light incident face and a connecting face extending between the light incident face and the light exit face, and an annular mounting face interconnecting the connecting face and the light incident face;
   wherein the light incident face is located at a center of the mounting face and recessed inwardly from an inner edge of the mounting face toward the light exit face of the lens, and the light exit face is a convex face;
   wherein the connecting face comprises a plurality of inclined reflecting planes located at a circumferential periphery of the lens and extending downwardly and inwardly from a position near to an outer edge of the light exit face toward the light incident face, the inclined reflecting planes of the connecting face are positioned around an optical axis of the lens, and the LED light source faces the light incident face of the lens;
   wherein each of the inclined reflecting planes of the connecting face extends from a position near to the outer edge of the light exit face toward an outer edge of the mounting face; and
   wherein the connecting face of the lens is radially symmetrical relative to the optical axis of the lens, and the mounting face is a horizontal plane and has a shape of a regular hexagon, and an angle between each inclined reflecting plane and the mounting face is equal to each other.

6. The LED light source unit of claim 5, wherein the angle defined between each inclined reflecting plane and the mounting face of the lens is an obtuse angle, and the obtuse angle is no less than a sum of a right angle and a critical angle for total internal reflection on the lens-air interface.

7. The LED light source unit of claim 5, wherein the connecting face of the lens further comprises a circumferential surface between the inclined reflecting planes and the light exit face, and the circumferential surface extends downwardly from the outer edge of the light exit face toward the outer edge of the mounting face.

8. An LED light source module comprising:
a plurality of LED light bars arranged side by side in an array, with each of the LED light bar comprising a printed circuit board and a plurality of LED light source units mounted thereon; and
a light diffuser consisting a plurality of light diffusing units each covering a corresponding LED light source unit for diffusing light from the corresponding LED light source unit;
wherein each LED light source unit comprises an LED light source and a lens coupled to the LED light source, the lens comprising a light incident face, a convex light exit face opposite to the light incident face and a connecting face extending between the light incident face and the light exit face;
wherein the connecting face comprises a plurality of inclined reflecting planes located at a circumferential periphery of the lens and extending downwardly and inwardly from a position near to an outer edge of the light exit face toward the light incident face, the inclined reflecting planes of the connecting face are positioned around an optical axis of the lens, and the LED light source faces the light incident face of the lens; and
wherein the LED light source units of two adjacent LED light bars are arranged in a stagger manner.

9. The LED light source module of claim 8, wherein the lens of each LED light source unit further comprises an annular mounting face interconnecting the connecting face and the light incident face, and the light incident face is located at a center of the mounting face and recessed inwardly from an inner edge of the mounting face toward the light exit face of the lens.

10. The LED light source module of claim 9, wherein the connecting face of the lens of each LED light source unit is radially symmetrical relative to the optical axis of the lens, and the mounting face is a horizontal plane and has a shape of a regular polygon, an angle between each inclined reflecting plane and the mounting face being equal to each other.

11. The light source module of claim 10, wherein the angle defined between each inclined reflecting plane and the mounting face of the lens is an obtuse angle, and the obtuse angle is on less than a sum of a right angle and a critical angle for total internal reflection on the lens-air interface.

12. The LED light source module of claim 10, wherein each light diffusing unit has a shape of the regular polygon of the mounting face of the lens.

* * * * *